UNITED STATES PATENT OFFICE 2,370,589

UNSATURATED CARBONATE ESTERS

Franklin Strain, Barberton, and Frederick E. Küng, Akron, Ohio, assignors to Pittsburgh Plate Glass Company, Pittsburgh, Pa., a corporation of Pennsylvania No Drawing. Application February 29, 1944, Serial No. 524,483

9 Claims. (Cl. 260—463)

This invention relates to new unsaturated esters having valuable properties as are described hereinafter.

One purpose of the invention is to prepare new unsaturated esters capable of being polymerized to transparent thermosetting resins. Such materials will be suitable for casting to form hard strong products or for impregnating porous substances or for liquid coating compositions.

A further object is to prepare carbonic acid esters containing a vinyl group ($CH_2=CH-$) attached directly to a carbonate radical $$(-O-CO-O-)$$

The new group of esters have one vinyl group and one other polymerizable group.

The family of esters has the formula:

$$CH_2=CH-O-\underset{\underset{O}{\|}}{C}-O-R$$

in which R represents any polymerizable group of three or more carbon atoms in which an olefinic linkage is present in a straight carbon chain and is between the second and third carbon atoms from the carbonate radical. Suitable unsaturated groups are those derived by esterification of alcohols such as allyl, methallyl, chloroallyl, crotonyl, propargyl, cinnamyl alcohols and methylvinyl carbinol.

All the esters of the invention are capable of polymerization through the active vinyl groups to form linear polymers and are also capable of polymerization through the other unsaturated group to form a cross linked structure which is hard and non-thermoplastic.

The new esters are prepared by the reaction of vinyl chloroformate with the desired unsaturated alcohol. Vinyl chloroformate is readily hydrolyzable and accordingly the reaction should be conducted under conditions which minimize hydrolysis. By using anhydrous reactants operation is possible at temperatures between 40° C. and the boiling point of the reaction mixture. During the reaction hydrochloric acid is evolved and should be eliminated. For this purpose we prefer to use an alkaline reagent such as pyridine or other tertiary cyclic amine or an oxide, hydroxide or carbonate of an alkali, or alkaline earth metal. Such reagents are capable of combining chemically with the hydrochloric acid and eliminating it from the reaction zone. When a strong alkali such as an alkali oxide or hydroxide is used in the presence of water the danger of hydrolysis of the chloroformate and the carbonate ester is greater and reaction temperatures of 20° C. or lower should be used. Since the reaction is exothermic artificial cooling is necessary. The desired reaction temperatures are maintained by submerging the reaction vessel in an ice bath or by circulating refrigerated brine or other coolant through a jacket on the reaction vessel or through submerged coils. A mechanical stirring apparatus will facilitate the dissipation of the heat of reaction.

Hydrolysis may be further minimized by combining the reactants in such manner that neither the chloroformate nor the vinyl carbonate ester will exist in contact with a great excess of strong alkali. Thus by slowly adding a stoichiometric mixture of the alcohol and the alkaline reagent to the vinyl chloroformate or by adding separate streams of alkaline reagent and vinyl chloroformate to the alcohol this objective will be achieved.

When relatively insoluble alkaline reagents such as calcium carbonate are used higher temperatures are required to obtain a satisfactory rate of reaction. Under such conditions it is very desirable to use anhydrous reactants or at least to minimize the water content.

The reaction should be conducted at such a rate that the desired temperature may be maintained. If high temperatures and slightly soluble alkaline agents are used the rate at which the reactants are combined is of little importance. In the usual conduct of the operation with pyridine or with water solutions of alkaline reagents at temperatures less than normal room temperature, it is necessary to add the reactants slowly. The rate of reaction may be readily controlled by watching the reaction temperature and mixing the reagents slowly enough to permit the complete dissipation of the heat of reaction and to maintain the temperature below a prescribed maximum.

After the reactants are completely mixed it is frequently desirable to stir the reaction mass for fifteen minutes to one hour in order to complete the reaction. The carbonate esters will form an immiscible layer if water is present. If water is not present in substantial quantities, enough should be added to dissolve the solids and form two distinct liquid phases. The added water may contain a little hydrochloric or other mineral acid to neutralize the excess of alkaline reagent. The ester layer is quickly separated from the water layer and dried over anhydrous sodium sulphate. If desirable, the ester may be washed one or more times with water or preferably with concentrated salt solutions for example sodium bisulphite before drying.

The more volatile of the esters may be further purified by distillation procedure either at atmospheric pressure or at reduced pressures. Care should be taken to avoid polymerization during or shortly after distillation. Some of the esters polymerize slowly at higher temperatures. If distillation is contemplated at temperatures of 100 to 200° C. small amounts of polymerization inhibitors such as hydroquinone, pyrogallol, copper or copper salts may be added.

The vinyl chloroformate used in this esterification may be prepared by the pyrolysis of ethylene glycol bis (chloroformate) at 400 to 600° C. and subsequent distillation. This procedure is described and claimed in copending application Serial No. 504,292 (A-288) filed September 29, 1943, by Frederick E. Küng.

The new polyunsaturated esters are colorless liquids of relatively low viscosity. Upon heating, especially in the presence of hydrogen peroxide, organic peroxides and organic percarbonates they become more viscous and finally are converted into transparent colorless solids which are generally infusible and are insoluble in benzene, ether, and acetone. The polymerization usually involves a transition through a fusible soluble intermediate stage which exists in solution prior to gelation. The first solid polymer formed is a clear gel which is elastic but not thermoplastic. Upon further polymerization the gel becomes harder and much stronger.

The temperature of polymerization depends upon the quantity and kind of catalyst present. The polymerization of the ester may proceed slowly at room temperature. Organic percarbonates catalyze the reaction at temperatures between 30° C. and 65° C. If polymerization is desired at temperatures between 65° C. and 100° C. more stable catalysts will be required. Acyl peroxides, such as benzoyl peroxide, will be effective in this temperature range. At temperatures above 100 C. the more active monomers can be polymerized without the addition of a peroxy catalyst. Monomers of lesser activity may require temperatures of 150° C. or 200° C. for such polymerization. Generally the catalytic polymerization is preferred since it is less difficult to control the rate of reaction by adjusting the kind and quantity of catalyst and the temperature of polymerization.

The polymers of the polyunsaturated mixed vinyl esters are hard and relatively brittle. They may be modified advantageously by copolymerization with thermoplastic monofunctional resins such as maleic anhydride, vinyl acetate, methyl methacrylate, styrene, vinyl chloride, butadiene and acrylonitrile.

Further details of the preparation and use of the new esters are set forth in the following specific examples:

Example I

Vinyl chloroformate (106 g.), prepared by the pyrolysis of ethylene glycol dichloroformate and purified by distillation, was slowly introduced into a 1000 ml. reaction flask containing 64 g. allyl alcohol (10 percent excess) and 87 g. of pyridine (10 percent excess) cooled to 0° C. on an ice bath. During the reaction the mixture was vigorously stirred to prevent local overheating. The addition of the reactants was made through a dropping funnel at a rate which permitted the maintenance of the temperature below 10° C. After the reagents were combined the mixture was stirred for 15 minutes to complete the reaction. About 250 cc. of 10 percent hydrochloric acid solution was added to neutralize the excess pyridine and to dissolve the pyridine hydrochloride which precipitated during the reaction. The ester was then washed with three 100 cc. portions of water and dried over anhydrous sodium sulphate. A clear colorless liquid, vinyl allyl carbonate, was obtained by distillation.

Example II

One mole of vinyl chloroformate (106 g.) was placed in a reaction flask provided with a dropping funnel, stirrer and a thermometer. After cooling to 0° C. a mixture of 80 g. methallyl alchol and 225 cc. of 20 percent NaOH solution was added gradually with constant stirring at the rate of 3 cc. per minute for ten minutes, then 5 cc. per minute for 10 minutes and finally the balance at the rate of 10 cc. per minute. The temperature rose to a maximum of 12° C. during the first ten minutes but thereafter did not exceed 8° C. After the reagents were completely mixed the stirring was continued for 30 minutes while maintaining the temperature. Cold dilute (10 percent) hydrochloric acid was added in amount sufficient to neutralize the excess NaOH. Two distinct liquid phases were thereby formed. The ester layer was then separated from the aqueous layer, washed three times with 100 cc. portions of saturated NaCl solution and immediately dried over anhydrous sodium sulphate. The crude ester was purified by distillation which process removed the volatile side-reaction products. Traces of yellow color were removed by heating with activated charcoal. A colorless liquid ester was obtained which was believed to have the structure:

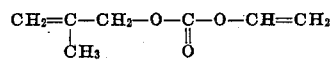

Example III

The procedure of Example I was repeated except that 80 g. crotonyl alcohol was used in place of the allyl alcohol and that 100 cc. of benzene was added to the reaction mixture as a diluent to prevent the formation of the thick slurry of pyridine hydrochloride. A clear liquid ester having the following structure was thereby obtained:

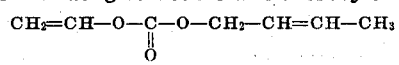

We have filed concurrently herewith an application, Serial No. 524,484, disclosing and claiming a group of esters and a method of preparation thereof, which application is generic to the scope of this application.

Although the invention has been described with respect to certain specific modifications it is not intended that the details of same shall be limitations on the scope of the invention except to the extent incorporated in the appended claims.

We claim:

1. A method of preparing mixed vinyl carbonate esters which comprises reacting vinyl chloroformate with an unsaturated alcohol.

2. A method of preparing mixed vinyl carbonate esters which comprises reacting vinyl chloroformate with an alkenyl alcohol having an olefinic bond between the second and third carbon atoms from the hydroxyl group, the reaction being conducted in the presence of an alkaline reagent at a temperature below 25° C.

3. A method of preparing vinyl allyl carbonate which comprises reacting vinyl chloroformate with allyl alcohol in the presence of an alkaline reagent.

4. A method of preparing vinyl methallyl carbonate which comprises reacting vinyl chloroformate with methallyl alcohol in the presence of an alkaline reagent.

5. A method of preparing vinyl crotonyl carbonate which comprises reacting vinyl chloroformate with crotonyl alcohol in the presence of an alkaline reagent.

6. As a new compound a vinyl alkenyl carbonate wherein the alkenyl group contains an olefinic bond between the second and third carbon atoms from the carbonate linkage.

7. Vinyl allyl carbonate.

8. Vinyl methallyl carbonate.

9. Vinyl crotonyl carbonate.

FRANKLIN STRAIN.
FREDERICK E. KÜNG.